June 26, 1934.  H. L. MONTEITH  1,964,328
SIGN
Filed July 26, 1932

Inventor
HUGH L. MONTEITH
By Ansey Cole
Attorney

Patented June 26, 1934

1,964,328

UNITED STATES PATENT OFFICE 1,964,328

SIGN

Hugh L. Monteith, Stirling, N. J., assignor to Blue Ridge Glass Corporation, Kingsport, Tenn., a corporation of New York Application July 26, 1932, Serial No. 624,795

6 Claims. (Cl. 40—132)

This invention has for its object to provide a background of changing appearance against which an inscription or legend can be made to stand out; for instance, as to attract attention to a sign by the varying character of its background. For this purpose I create a field of points of light, to be observed through a lens field, the several lenses of which are arranged at such a distance from the plane of the light points as to focus thereon and shift the field of light points or of the lenses in respect to each other. This may be accomplished either by shifting a field of reflecting or refracting elements, projecting the light points to the light field, or it may be accomplished by shifting the angle from which light falls on the reflecting member, to be reflected thereby to form the light field.

My invention, therefore, consists in the construction, arrangement and combination of the several parts of which it is composed, as will be hereinafter described and claimed.

Referring to the accompanying drawing in which corresponding parts are designated by corresponding marks of reference, Figure 1 is a vertical longitudinal section through a sign, according to this invention forming the light field by reflection, the section being taken on line $X^1$—$X^1$ of Figure 2.

Figure 1:
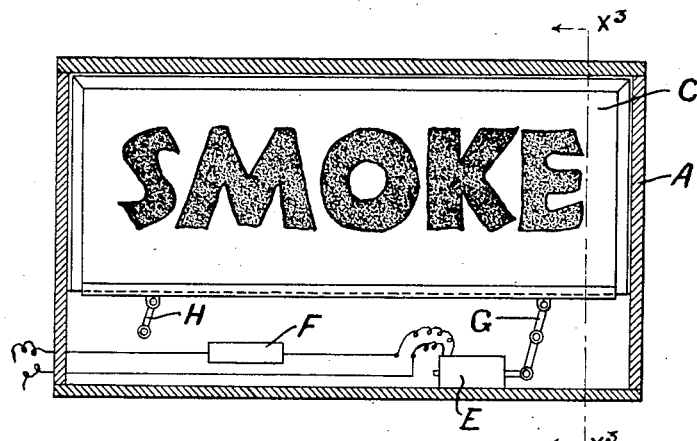
Figure 3:
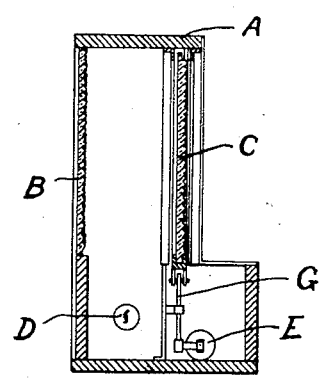
Figure 3 is a vertical transverse section on lines $X^3$—$X^3$ of Figures 1 and 2.
Figure 2:
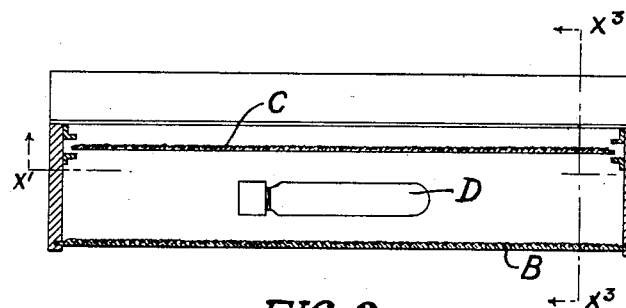
Figure 2 is a horizontal section thereof.

Referring now to the form shown in Figures 1, 2 and 3, a suitable frame A has a glazing of lens glass B in the front thereof, and at a suitable distance behind the glass B is arranged the oscillating projecting field formed by a plate C which carries the legend to which attention is to be attracted. The glass C is silvered on its rear surface. Each of the glasses B and C may be formed of hammered sheet glass or of any other glass having lenticular projection on its surface. The legend may be carried by the plate C in any approved manner. For instance, it may be painted on the plate by an opaque paint, in which case the sign or inscription will appear dark against a scintillating background.

In the base of the case A in front of the plane of the plate C is arranged a light source, such as a lamp D. In the base is also placed a solenoid E, in the circuit of which is a suitable current interrupter, such as the flasher F. The solenoid core is connected by the lever G with the plate C, which is capable of moving on the pivot of such lever and on the pivot of the link H in a plane parallel with the plane of the front glass B.

The distance between the two fields formed by the two glasses B and C is such that the lenses in the lens field are focused in the plane in which the light from the lamp is focused to points by the reflectors of the projecting field.

The diameter of the lenses on the plates may vary, but I have found good effects to be produced with lenses approximating from a 32d to a quarter of an inch.

With such an arrangement each of the individual bumps or lenses on the front plate B acts as a plano-convex lens receiving reflected light from the silvered rear figured sheet in such a way as to produce a series of bright spots of light between which there is practically a black background. Considering only a single lens element and the corresponding light point due to reflection from the projecting element, it will be found that when the eye is in a suitable location that the entire lens appears to be filled with light. In any other location the lens appears dark.

Moving the one plate (in the present instance the rear plate) in respect to the other causes each lens element to apparently give out a series of flashes of light, alternated with dark intervals. With a plurality of lenses as is formed by the sheet B of hammered glass, and a plurality of bright points of light as is formed by the rear plate C, if the points of light are distributed with exactly the same lateral spacing as the lenses on the front plate B, all of the lenses would flash up brightly at the same time, or be dark at the same time. If, however, the points of light are spaced irregularly with respect to the lenses of the front plate, only a part of those lenses will at any time be bright, and the rest will be dark. Slowly moving one plate in respect to the other results in a remarkable scintillating effect.

In accordance with what has been before said, the spacing of the lenses of the two plates may be equal or may be dissimilar, dependent on whether a flashing or a scintillating sign is wanted. In any event the lenses on the two plates should give a somewhat regularly repeated figure. and the individual lenses should have about the same individual focal length.

Figure 4:
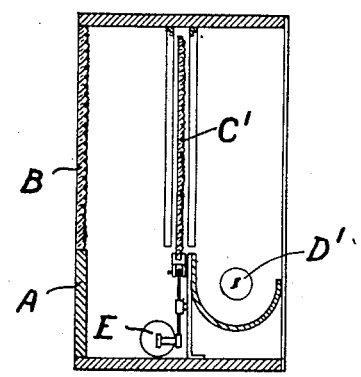
Figure 4 is a vertical transverse section through a similar sign, forming the light field by refraction.

Instead of silvering the rear surface of the rear plate C and using the lens element thereon as reflecting members they may be used as dioptric elements; that is to say, as is shown in Figure 4 the plate C¹ may be left unsilvered and the light source D¹ placed behind it.

Figure 5:
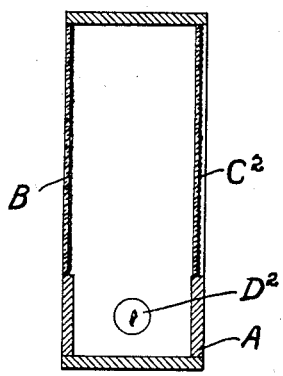
Figure 5 represents a form of my invention in which the scintillating effect is obtained not by moving the lens field or the projecting field but by varying the angle in which the light falls on the latter.
Figure 6:
Figure 6 is an enlarged sectional view through a glass suitable to form either the lens field or the projecting field.

In both forms of the invention before described the alternate energization and de-energization of the solenoid E will result in a movement of the one plate (in the structures shown in the plate C or C¹) in respect to the other plate, but comparable effects may be obtained by holding both plates stationary and changing the direction in which the light falls on the rear element. This is shown in Figure 5 in which both plates B and C² are fixed and the plate C² has its rear face formed into lenses properly silvered, with a flashing light D² in the base of the case. If such a sign is observed from the front in a moderately strong light, the pattern produced will be that due to reflection by the rear lenses of external light passing through the front plate. If, however, the light source D² be illuminated, the points of light produced by the projecting system are shifted from the position occupied by the light points previous to such lighting, and a different effect will be produced to the eye of the observer.

Having thus described my invention what I claim as new and desire to secure by United States Letters Patent, is:

1. The combination with two sheets of glass each having a plurality of lens elements arranged thereon in a regular pattern, the one sheet being arranged behind the other, and a light source so located that the light thereof is projected as a series of light points by the elements of the rear field to the focal plane of the elements of the front field.

2. The combination with two sheets of glass each having a plurality of lens elements arranged thereon in a regular pattern, the one sheet being arranged behind the other, a light source so located that the light thereof is projected as a series of light points by the elements of the rear field to the focal plane of the elements of the front field, and means for shifting the one field laterally in respect to the other.

3. The combination with two sheets of glass, each having a plurality of lenticular projections arranged thereon in a regular pattern, the one sheet being arranged behind the other, and a light source so located that light thereof is projected as a series of light points by the projections of the rear field to the focal plane of the projections of the front field.

4. The combination with two sheets of glass, each having a plurality of lenticular projections arranged thereon in a regular pattern, the one sheet being arranged behind the other, a light source so located that the light thereof is projected as a series of light points by the projections of the rear field to the focal plane of the projections of the front field, and means for shifting the one field laterally in respect to the other.

5. The combination with two sheets of glass each having a plurality of lenticular projections arranged thereon in a regular pattern, the one sheet being arranged behind the other, a light source so located that the light thereof is projected as a series of light points by the projections of the rear field to the focal plane of the projections of the front field, the rear sheet having a mirror back.

6. The combination with two sheets of glass, each having a plurality of lenticular projections arranged thereon in a regular pattern, the one sheet being arranged behind the other, a light source so located that the light thereof is projected as a series of light points by the projections of the rear field to the focal plane of the projections of the front field, the rear sheet having a mirror back and means for shifting the one sheet laterally in respect to the other.

HUGH L. MONTEITH.